United States Patent
Deen et al.

(10) Patent No.: US 8,682,903 B2
(45) Date of Patent: Mar. 25, 2014

(54) SYSTEM AND METHOD FOR SYNCHRONIZED CONTENT DIRECTORIES ON CLUSTER DEVICES

(75) Inventors: Robert Glenn Deen, San Jose, CA (US); Hongxia Jin, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 548 days.

(21) Appl. No.: 12/631,826

(22) Filed: Dec. 5, 2009

(65) Prior Publication Data
US 2011/0137916 A1 Jun. 9, 2011

Related U.S. Application Data

(63) Continuation of application No. 12/494,883, filed on Jun. 30, 2009.

(51) Int. Cl.
*G06F 7/00* (2006.01)

(52) U.S. Cl.
USPC .......................................................... 707/747

(58) Field of Classification Search
USPC .................................................. 707/747, 737
See application file for complete search history.

(56) References Cited

U.S. PATENT DOCUMENTS

| | | |
|---|---|---|
| 2002/0099691 A1* | 7/2002 | Lore et al. .......................... 707/2 |
| 2005/0004995 A1 | 1/2005 | Stochosky |
| 2005/0015713 A1 | 1/2005 | Plastina et al. |
| 2005/0044356 A1* | 2/2005 | Srivastava et al. ............. 713/163 |
| 2005/0149481 A1 | 7/2005 | Hesselink et al. |
| 2005/0208803 A1 | 9/2005 | Rohatgi et al. |
| 2006/0048232 A1 | 3/2006 | Jung et al. |
| 2006/0053239 A1 | 3/2006 | Zheng et al. |
| 2006/0272031 A1 | 11/2006 | Ache et al. |
| 2007/0192512 A1 | 8/2007 | Kwon et al. |
| 2008/0091688 A1 | 4/2008 | Yun |
| 2008/0120401 A1 | 5/2008 | Panabaker et al. |
| 2010/0332506 A1* | 12/2010 | Deen et al. .................... 707/759 |

OTHER PUBLICATIONS

Merkle, R., "Protocols for Public Key Cryptosystems, Proceedings of the 1980 IEEE Symposium on Security and Privacy (Oakland, CA, USA)", pp. 122-134, Apr. 1980.
Merkle, R., "Secrecy, authentication, and public key systems", Ph.D. dissertation, Dept. of Electrical Engineering, Stanford Univ., 1979.
Wikipedia: Hash Tree, http://en.wikipedia.org/wiki/Hash_tree.
Jain, Navendu and Dahlin, Mike and Tewari, Renu, "TAPER: Tiered Approach for Eliminating Redundancy in Replica Synchronization", 4th USENIX Conference on File and Storage Technologies, (2005), pp. 281-294.

(Continued)

*Primary Examiner* — Truong Vo
(74) *Attorney, Agent, or Firm* — Cantor Colburn LLP; Yusuke Kanehira (57) ABSTRACT

According to embodiments of the invention, a system, method and computer program product for a computer program product for synchronizing content directories on cluster devices are provided. Embodiments generate a binary tree for each device in a cluster of devices, the binary tree representing the locations of all copies of content residing in the device. The binary tree for a plurality of other devices in the cluster may be stored in each device the binary tree. The binary trees for the plurality of other devices may be used to determine availability of content and the available content may be displayed to a user.

20 Claims, 5 Drawing Sheets

(56) References Cited

OTHER PUBLICATIONS

Tree Hash EXchange format (THEX), http://www.open-content.net/specs/draft-jchapweske-thex-02.html.

RFC4998 Evidence Record Syntax (ERS), http://tools.ietf.org/html/rfc4998.

Wikipedia: High-definition Audio-Video Network Alliance (HANA), http://en.wikipedia.org/wiki/High-Definition_Audio-Video_Netowrk_Alliance.

http://www.hanaalliance.org/press/WhitePapers/HomeNetworkingAndFlyingCarsv1_5Short.pdf.

* cited by examiner

SYSTEM AND METHOD FOR SYNCHRONIZED CONTENT DIRECTORIES ON CLUSTER DEVICES

CROSS REFERENCE TO RELATED APPLICATIONS

This application is a continuation of U.S. application Ser. No. 12/494,883 filed on Jun. 30, 2009.

BACKGROUND

The present invention relates to clusters of media devices, and more specifically, to updating content directories in clusters of media devices.

Media devices have advanced from first generation devices, which are used individually as distinct devices, to devices which operate as part of a cluster of devices in a content cluster to store and playback digital content. An important ability is the presentation of the list of digital content available to the user in the content cluster.

A set of one or more consumer electronic devices which cooperate together to hold and playback digital content may be referred to as a content cluster. The digital content may be still pictures, video, and/or audio files. The cluster enables devices to access content held on other devices in the cluster over a data network. Devices in a content cluster typically provide the role of storage devices which store digital content, and/or rendering devices which playback such content. It is possible for both roles to be embodied in one device. The devices may be bound together in a cluster connected together over a data network of one or more networking protocols and methods. The devices in a cluster may be located together in close proximity of one another, or may be widely separated physically. A content cluster may or may not have a device which operates as a master or head device coordinating the activities of devices in the cluster.

SUMMARY

According to one embodiment of the present invention, a method comprises: creating an aggregated list of each item of digital content stored in each device in an interconnected cluster of the devices; and generating a binary tree by placing a hash representation of a group of the items of digital content on the leaf nodes of the binary tree and calculating higher nodes on the binary tree as hash values of lower nodes until a root node is calculated, wherein a change in any item of content in any of the devices results in a change a plurality of the nodes.

According to another embodiment of the present invention, a method comprises: acquiring a device list of content from each of a plurality of electronic devices, thereby resulting in a plurality of device lists; aggregating the device lists into an aggregated list of the content on the devices; obtaining an update of the device list for each portion of the device list that has changed since the most recent acquiring; maintaining a copy list of copies of each particular content item for which at least one copy exists among the devices; and sending to each of the devices the device lists of the other devices.

According to a further embodiment of the present invention, a system comprises: a plurality of interconnected media players, each having access to items of content, the media players capable of exchanging the digital content with each other; a content list in each device containing a list of each item of content in the devices and the location of replicas of the item of content in the devices; and a binary tree representation of each content list on each device.

According to another embodiment of the present invention, a computer program product for synchronizing content directories on cluster devices comprises: a computer usable medium having computer usable program code embodied therewith, the computer usable program code comprising: computer usable program code configured to: generate a binary tree for each device in a cluster of devices, the binary tree representing the locations of all copies of content residing in the device; store in each device the binary tree for a plurality of other device in the cluster; use the binary trees for the plurality of other devices to determine availability of content; and display the available content.

DETAILED DESCRIPTION

Embodiments of the invention provide a system, method and computer readable medium for synchronizing content directories on cluster devices. Devices, or a subset of cluster devices, which are members of the cluster, on occasion, may be isolated from the rest of the cluster. This may occur, for example, when a device that is not connected to a data network may continue to operate as a member of the cluster, but with access reduced to only the content which they hold either locally, or to content held on the subset of cluster devices to which they can communicate. In general, a subset of a content cluster may continue to operate regardless of its ability to communicate with any other set of devices in the cluster. However, the ability of the device to access or render particular content may be reduced due to the inability to access the content, or the inability to deliver the content to a device capable of rendering it.

Content to be rendered may either be copied from the storage device to local storage in the rendering device, or it maybe directly streamed over the data network to the rendering device without being stored in persistent storage on the rendering device. Devices in the cluster may be intermittently connected to the data network which connects the cluster together. Devices, such as portable video and audio players may connect only periodically with the rest of the devices in the cluster, so as to obtain more content, or to share held content with other devices. Some examples of the use of the cluster by a user include:

1. User using a device with a user interface of some sort, either audio, text, graphical, or any combination of the three, will access an aggregated list of content available on the devices in the cluster. This list may include content which is held on devices currently connected to the network and online, and readily available for accesses, as well as content which is held on devices which are not currently online.

2. The user selects the content for playback from the aggregated list.

3. The user may optionally select one or more devices which the content will be rendered on.

4. The files containing the digital media content will be accessed by the rendering devices, rendered, and output.

Embodiments of the invention provide ways to build and maintain an aggregated list of content in a cluster. These embodiments efficiently accomplish this in various cases ranging from building a list of all content when all devices in the cluster are actively online, through the case of one device with no connectivity to any other device in the cluster. Embodiments of the invention include an efficient method for synchronizing content list information between devices. These embodiments may provide one or more of the following functions:

1. Representation of digital content held on devices using unique identifiers and replica location information stored in a binary tree of hashes.

2. Use of a binary tree of digital content to efficiently synchronize content entries between devices in the cluster.

3. Use of a binary tree of digital content to identify which content items in a list of content held on a device have been added, removed, or changed on the device.

4. Use of a synchronization scheme, and content replica information to efficiently construct lists of content held within all devices in the cluster.

5. Use of a binary tree representing a content list as a means to more efficiently locate those portions of a list which have changes when maintaining a larger aggregated list of all the content held by devices in a cluster. This is an improvement over prior methods of explicitly exchanging lists of changed content items. Furthermore, unlike the aggregated list of content which grows each time a new item is held on the network, the size of the binary tree remains fixed regardless of the number of items of content held in the cluster. This means that the amount of data to exchange, and the time to detect when a change has occurred remains fixed and never increasing even when managing very large numbers of content items.

6. Use of a binary tree to reflect quickly changes in the availability of content based upon the availability of a device on the network.

An inefficient solution to the problem of building the aggregate list of all content on all devices in the cluster would be to inventory each device in the cluster obtaining an explicit list of each content item held, and aggregate these results together into a single list. Each device that needed such a list would itself perform the necessary tasks of obtaining the inventory of each storage device. In the most trivial case this list would be built anew each time it was to be used. Several efficiencies are immediately obvious, resulting from storing and reusing the list, as well as from having one device prepare the list and reuse it amongst several devices.

Embodiments of the invention provide a more efficient and non-trivial solution to this problem by employing the following five main steps.

1. Construction of an aggregated list by obtaining the list of content from each device in the cluster.

2. Maintenance of the aggregated list by only obtaining updates of those portions of the list of content which have changed on a device since the last list of content on it was obtained, or synchronized with. This is performed by grouping content items on a device into sub-lists and then processing the each group using a hash function to produce fixed sized hash value representation of the sub-list. These hash values may then be placed as the leaf nodes of a binary tree. A binary tree may then be constructed where the higher level nodes are the hash value of lower nodes. The binary tree may be represented in a standardized way for sharing between devices. The binary tree node values may then be compared with previously stored versions to detect changes and a comparison may be made of the binary tree node values from one device to those on another device to detect commonly held content.

3. Maintenance of a list by each device in the cluster for each item of content it tracks. This is a list of all known instances of copies or instances of the same content item on any device in the cluster. This is done so as to enable efficient addition/removal of content items from the list of content items which are available for access as devices come online or go offline with respect the device presenting the list of available content to the user. A content list is held in a device along with a content identifier for each content item. This maintenance is accomplished by first generating a listing of each device which holds a copy of a content item along with its content item identifier. Next, the list is maintained by synchronizing it for each content item with the other devices in the cluster which contain information about replicas of the content item. The list of devices is including in the information represented in the binary tree used for aggregate list management such that changes to the list of replicas are reflected in the binary tree.

4. Exchange of the binary tree representing a device's content list with other devices in the cluster.

5. Exchange of the content sub-list in the content list subgroup which has been identified by a device as having items of interest (changed items) after processing the binary tree from that device.

The above-described solution is efficient because it allows a device in the cluster to present an accurate aggregated list of content in the cluster both online and offline, with reduced amount of data needing to be communicated between devices to detect changes in the list. Also, there are reduced processing requirements in terms of both CPU and memory on devices as a result of reduced data size. This solution is also an efficient way to accomplish the task of updating the list presented to a user as devices come online or go offline, since the list presenting device need only note the availability of a device, and use the replica information in the list to add/remove items based upon the device ID.

Figure 1:
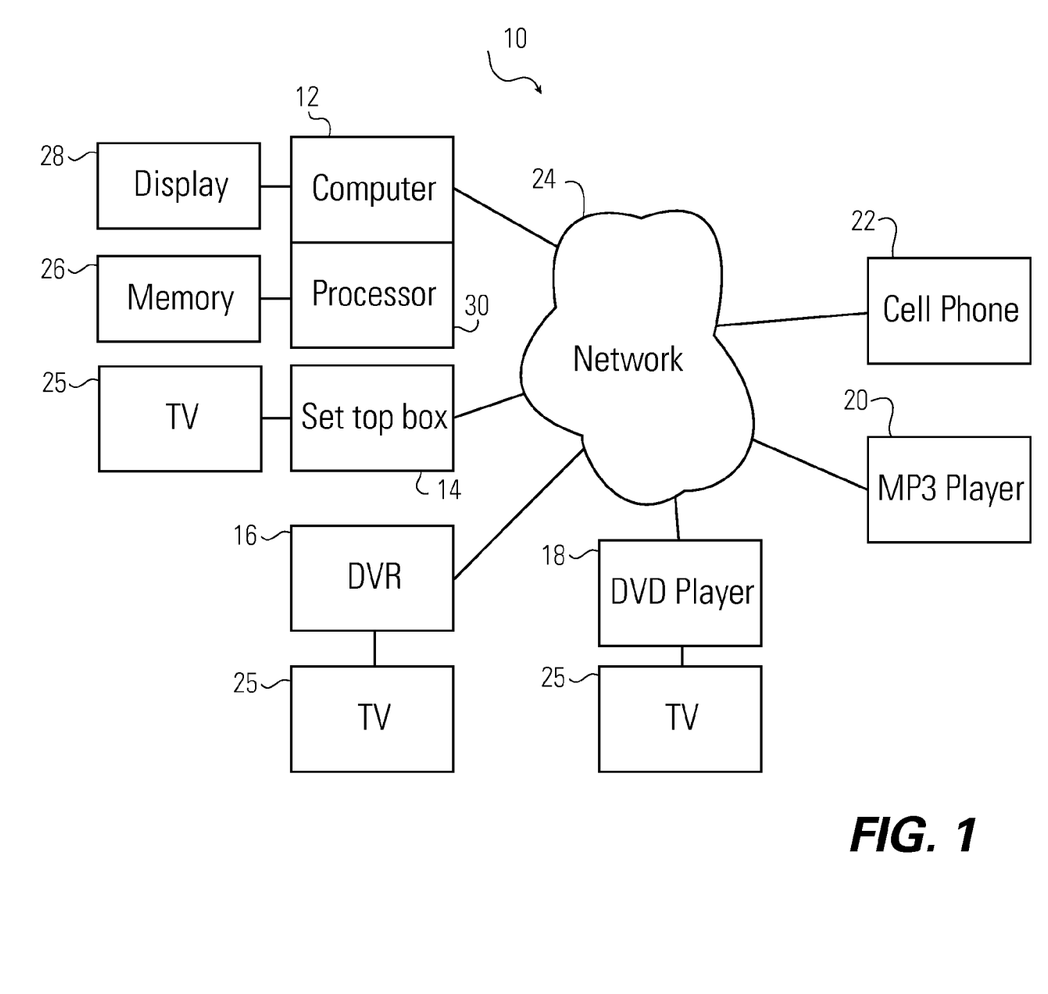
FIG. 1 shows a block diagram of a content cluster of devices in accordance with an embodiment of the invention.

Referring now to FIG. 1 there is shown an exemplary content cluster 10 according to an embodiment of the invention. A plurality of devices, such as a computer, 12, a set top box 14, a digital video recorder (DVR) 16, a DVD player 18, an MP3 player 20 and a mobile telephone 22, are all connected to a network 24, such as a local area network (LAN) or a wide area network (WAN). In some embodiments, the network may connect the devices using Ethernet, or IEEE 1394, either over copper, fiber, wireless transports, or a combination of these methods. The set top box 14, DVR 16 and DVD player are each connected to one or more televisions 25. The computer 12 also includes an external memory unit 26, an external display unit 28 and a processor 30. It will be appreciated that the other devices 14-22 beside the computer 12 may all include internal or external memory units, display units and processors.

It is desirable for content stored in any of the devices 12-22 to be accessible to each of the devices. Information regarding the content in the various devices is stored in content lists, which consist of a unique identifier for each item of content, as well as a list of each known copy of the content item and the device which hold the copy.

Content items in the content cluster are identified by an identifier which is uniquely associated with the content item such that any two or more instances of the same content item (e.g. movie or song) regardless of what device they are stored on, will have the same content identifier.

A number of different known processes for issuing content IDs to ensure uniqueness may be used with the exemplary embodiments. An example of a valid identifier would be the use of the International Standard Audiovisual Number (ISAN) which is a unique permanent number assigned to a work. This value is the same for all distributions of the work regardless of format (e.g. DVD). Currently ISAN numbers are used with the advanced access content system (AACS) protected works published on Blu-Ray format discs.

The system used to identify a work may vary by the type of work. For example while ISAN is used for movies on Blu-Ray discs, it may not be what is used to identify other works such as photographs. Thus, in order to support a variety of content identification systems, the cluster could employ an encoding of a Universal Resource Identifier (URI), which incorporates the work type unique identifier with additional information such as the work type, the work identification system, or the work identification authority to disambiguate between works using different schemes.

In addition, instances of a content item are distinguished by a replica ID. This identifier is such that any two replicas of the same content item will have distinct replica IDs.

In order to locate a given replica instance of a content item, an identifier which allows the system to uniquely distinguish devices from one another is used. The exact form of this device ID depends on the underlying networking scheme used to connect the devices. For content clusters built upon IP networks, this device ID could be the IP address of the device, or the device name registered with the networks Domain Name Service (DNS). More generally, it could a more descriptive form such as a Universal Resource Identifier (URI) or Universal Resource Name (URN).

For the purposes of this content list scheme, the exact form of the Device ID is not important, but rather its property that it can by used to uniquely distinguish the device.

The basic element in a content list, either on an individual device or the aggregated list of the entire cluster, is the content element. The content element consists of at a minimum the following two pieces of information: 1) Content ID; and 2) A list of replica elements for the known replicas, each replica element comprises the replica ID of the replica and the device ID of the device on which the replica resides. For example, the replica elements may appear as {[Replica ID, Device ID], [Replica ID, Device ID]}

The content element for an item which has only a single instance in the entire cluster will contain the content ID and a single replica element referencing the single instance in the cluster.

At a minimum a device contains a list of the content elements for the content which reside, or are accessible to the cluster through the device. To facilitate efficient expression and sharing of a content list, the content list is processed into a binary tree of hashes which represents the content list on a device. The hash function reduces any input set of characters into a fixed length value which differs from any other value produced by the same function for a different input set. One embodiment may use a cryptographic hash such as Advanced Encrypted Standard (AES) AES-128.

The binary tree representing the content list is constructed by a four step process. First, entries in the content list are partitioned into groups based upon some grouping criteria. A practical example of an acceptable criterion would be the first two bytes of the content ID. The group need not be statistically evenly distributed, nor have any other property other than to break up the list into parts which can be used to build a hash tree.

The second step is to calculate the hash of the list of content entries in each partitioned group. These hash values, one per group, form the leaves of the hash tree.

In the third step, a binary tree is computed by computing a new higher node value from the hash of the two nodes in the tree immediately below a node combined together and then hashed. If there are an odd number of nodes at a given level, the last node at the new level contains the hash of the single odd-out node below it.

In the fourth step, the above third step is repeated moving up the tree until a single ROOT node is computed. These four steps produce a binary tree representing the current state of the content list that it is built from.

The partitioning criteria used will determine the number of groups the list will be broken into. This in turn determines the number of leaves in the tree, and in turn, the height of the tree, which determines the overall size of the tree, the amount of data it takes to represent the tree, the amount of data which must be transmitted between devices, and the amount of data that a device must be compare to determine if a device it is synchronizing with has content list data that it wants to obtain. A partitioning which results in a wider tree makes it possible to more finely track changes to the content list, however the size of the tree can quickly become large.

Figure 2:
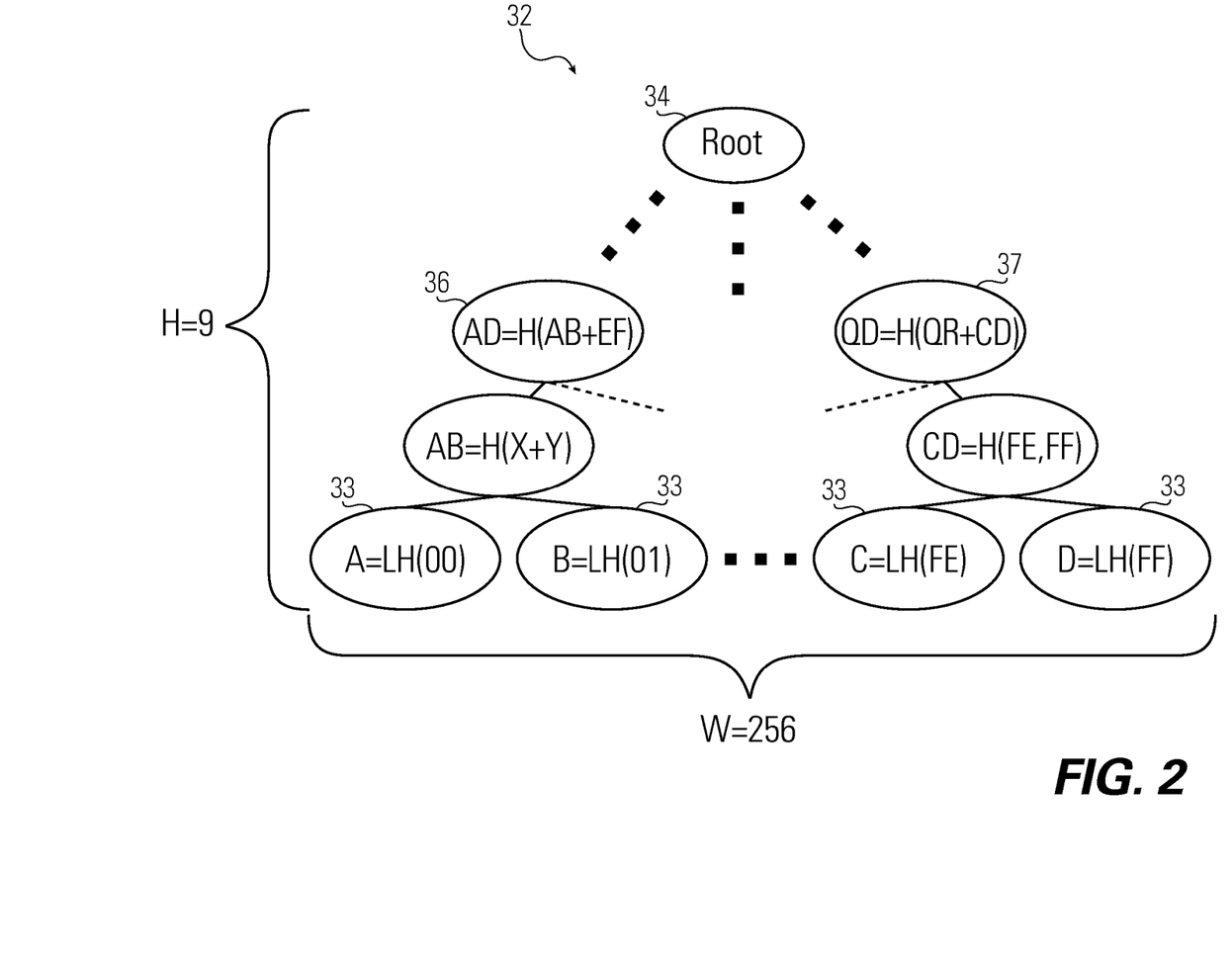
FIG. 2 shows a diagram of a binary tree in accordance with an embodiment of the invention.

FIG. 2 shows an exemplary binary tree 32 according to embodiments of the invention. In this example, AES128 is used as a hash to produce a 128 bit/16 byte hash value, using the first two characters of the content ID as the grouping criteria. This would produce the hash tree 32 for the device content list. This example tree 32 has 256 leafs 33 since the example content ID is 16 byte value expressed in hexadecimal with the following character range [0 . . . 9,A-F]. Using the first two bytes of such a content ID results in a possible 256 groups with first two bytes ranging in value from 00 through FF. In turn this produces a tree of 9 levels, and 511 nodes each holding a 16 byte hash value. Thus the entire tree is 8176 bytes in size.

Each node of the binary tree is same size, because the hash function always returns a fixed number of bits. As a result, the hash tree can be expressed as a contiguous series of bytes composed of the values of the nodes appended together following a fixed path through the tree.

An example of a fixed path through the tree is a breadth first path starting from the root node 34, followed by the left most node 36 at the next level, and through each node at that next level in turn until the right most node 37 is reached. This process is repeated level by level until the process reaches the last level of leafs, which are traversed in the same way. This system can use any path traversal method so long as it is consistently followed by all devices.

Applying the above described breadth-first approach for traversal to the above example would produce the following 8176 byte string express of the example tree, where node 1 is the root node and node 511 is the last leaf node.

[node1]$_{16\ bytes}$[node 2]$_{16\ bytes}$ . . . [node 511]$_{16\ bytes}$=String of 8176 bytes in the range [0 . . . 9,A-F]

The value of the leaf node for a particular group will change if the group of content entries in it changes. Such a change would occur if new items were added to, or removed from the group, or if any of the content entries in the group changed. Thus, any change to the content list, or any change to an element in the content list, is reflected by a change in the hash value of the group to which the change applied. In turn, since each higher level is computed based upon the lower level, changes at the leaf nodes are reflected upwards in the tree. Finally, the root node 34 value will change. Changes of a node at a given level reflect that one or more changes have occurred in the nodes below it.

Thus it is possible to see if any changes to the entire content list have occurred by examining simply the root node 34. If it has a new value, then one or more changes have occurred in the list. The location of the changes can be deduced by comparatively examining the tree 32 moving downward from the root node 34. A change in a node at a given level indicates a change in the nodes below it. While no change in a node, reflects that no changes have occurred in any of nodes in the branch below it. This forms a highly efficient mechanism to first detect if the content list has changed, and to locate where the changes have occurred. By storing the most recently stored tree of a given content list, and comparing it to the latest hash tree of the same list, it is possible to efficiently determine if the list has changed, and if so, to identify those groups which have changes in them. One advantage of such a comparison is that it on average allows the location of changed leaf node values to be determined faster than a sequential search of all the leaf nodes for changes, so long as not all the leaf nodes have changed.

Each device in the cluster exchanges its content state trees with every other device. By comparing the current tree from a device with the previous tree received, it is easy to detect which groups of content have had additions or deletions. A second comparison, by the receiving device, allows it to determine which leaves of the tree it must retrieve from the other device to update its local list of content. This comparison of trees can be done using simple equality comparison operators; for example, if you XOR the values and the result is all 0s, then there was no changes in the branch. This is made possible since all the values are of the same length as a result of the hash function used. These comparisons are quick to perform, as they require only primitive operations, instead of slower more complex comparison logic.

By exchanging the expressed binary tree of the content list tree between devices, a small amount of data can be used to determine which partition of the content list must be exchanged to obtain information about replicas held on the other device, or to include content on another device in an aggregated list of content.

A device may use this synchronization to maintain the replica information for the items in its own content list. This is done by monitoring those content list sub-groups which the device also has content in. When the new binary tree content list representation from another device is obtained, it may first be filtered such that only those sub-groups which the local device also has content in are compared with the archived binary tree from the last synchronization. This makes the comparison more efficient as it eliminates processing of sub-groups which are not of interest to the device.

Using the mechanisms described above, a device building the aggregates list of content in the content cluster must first inventory each device obtaining the list of content held on the device. This list is then aggregated into the aggregate list.

Thereafter, the list is maintained by first obtaining the binary tree representing the content list on a device, and processing it to identify those content list subgroups that have changes. This is done by comparing it with the binary tree last obtained from the device during the last synchronization event. If changes are detected, then the sub-groups and only the changed sub-groups are obtained from the device. These subgroups are then processed to update the information for the affected content items in the aggregate list.

Using the replica information in the content list items, it is possible for a device to efficiently present a list of content which is available on online devices, or conversely a list of content which is not available online at the moment. Such a presentation could take the form in a variety of ways including using a different font or coloring for available content items.

The presenting device can use the list of devices which are online to select the list of items which have replicas on the online devices. Conversely, the list of unavailable content can be constructed by selecting those content items which are not on any of the online devices.

Figure 3:
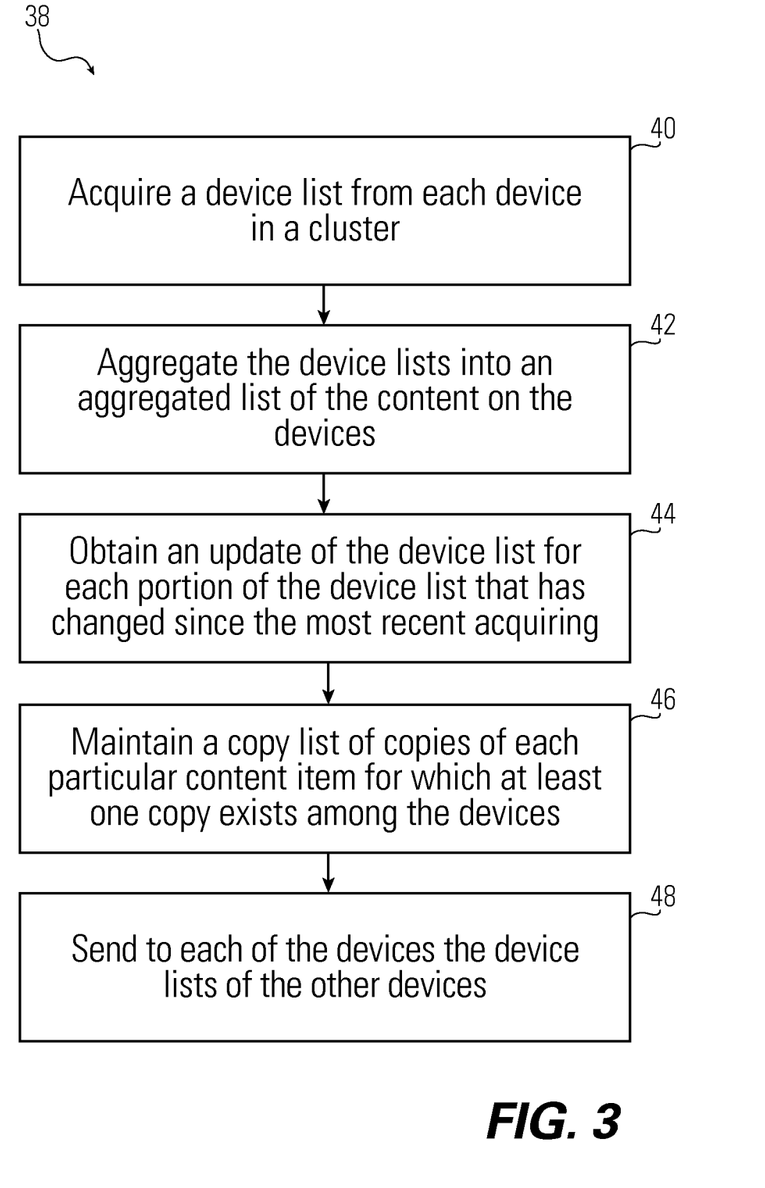
FIG. 3 shows a flowchart of a process for synchronizing directories of digital content on a plurality of devices in a cluster in accordance with an embodiment of the invention.

FIG. 3 shows a flowchart of a process 38 for synchronizing directories of digital content on a plurality of devices in a cluster in accordance with an embodiment of the invention. At block 40, a device list is acquired from each device in the cluster. In some embodiments the device list is represented as a binary tree. The device lists are aggregated into an aggregated list of the content on the devices in block 42. An update of the device list is obtained for each portion of the device list that has changed since the most recent acquiring, in block 44. At block 46, a copy list is maintained of copies of each content item for which at least one copy exists among the devices. At block 48, the device sends to each of the devices the device lists of the other devices.

Figure 4:
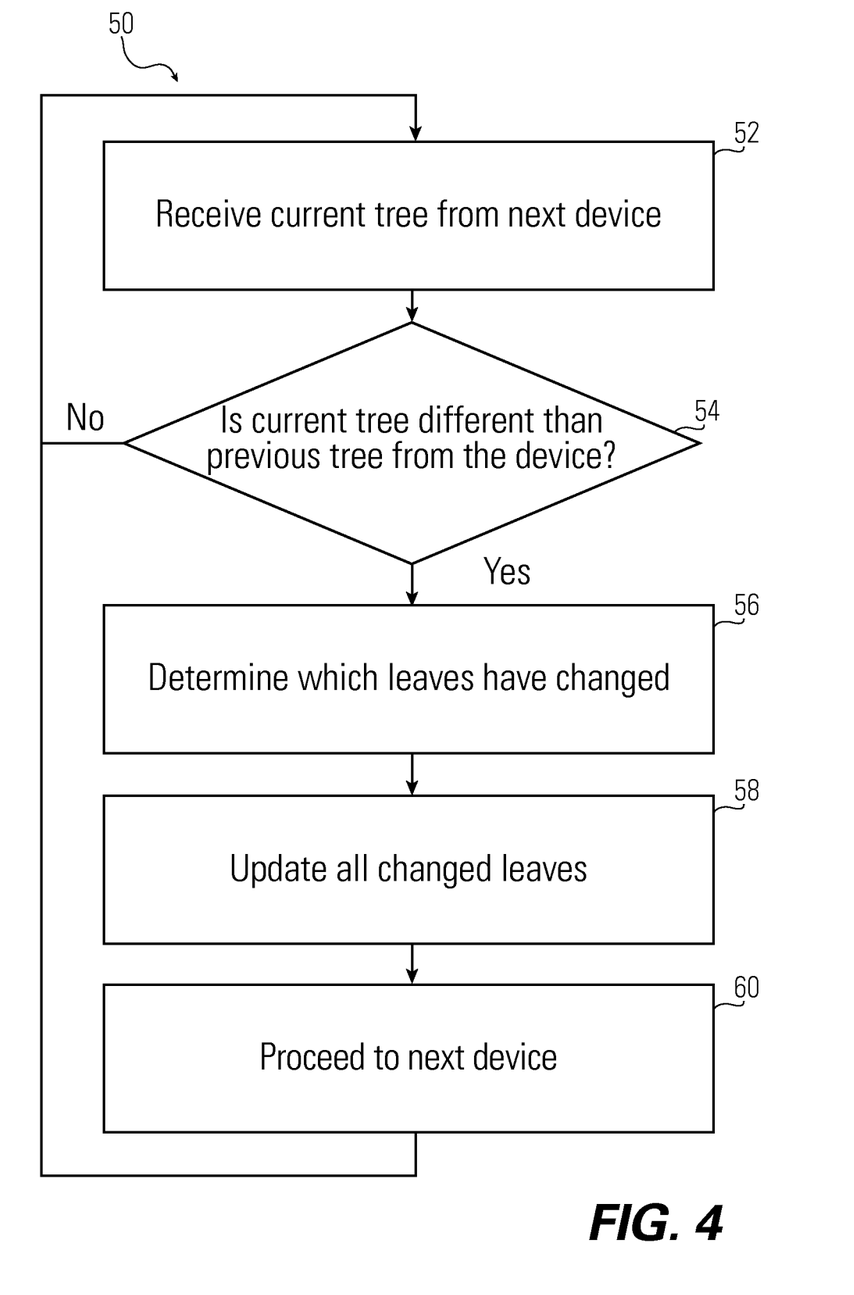
FIG. 4 shows a flowchart of a process for synchronizing content lists between devices in a cluster of devices in accordance with an embodiment of the invention.

FIG. 4 shows a flowchart of a process 50 for synchronizing content lists between devices in a cluster of devices. At block 52 the current binary tree is received from a device. The process then determines if the current tree is different from the previous tree received from the device, in decision diamond 54. At block 56, the process determines which leaves have changed. All the changed leaves are then updated at block 58. At block 60, the process 50 moves back to block 52 to process the next device until all the devices in the cluster have been processed.

As can be seen from the above disclosure, embodiments of the invention provide a system by which a content cluster may build and efficiently maintain a list of content stored in the cluster. Also, a means by which devices may individually efficiently maintain a list of replicas of content held by other devices. This efficiency results from the use of a binary tree representing the content list on an individual device, and the exchange and processing of changes in this list between devices.

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system."

Furthermore, the present invention may take the form of a computer program product embodied in any tangible medium of expression having computer usable program code embodied in the medium. Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction running system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wire line, optical fiber cable, RF, etc.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may run entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which run via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which run on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more instructions for implementing the specified logical function(s). It should also be noted that, in some alternative implementations, the functions noted in the block may occur out of the order noted in the figures. For example, two blocks shown in succession may, in fact, be run substantially concurrently, or the blocks may sometimes be run in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Figure 5:
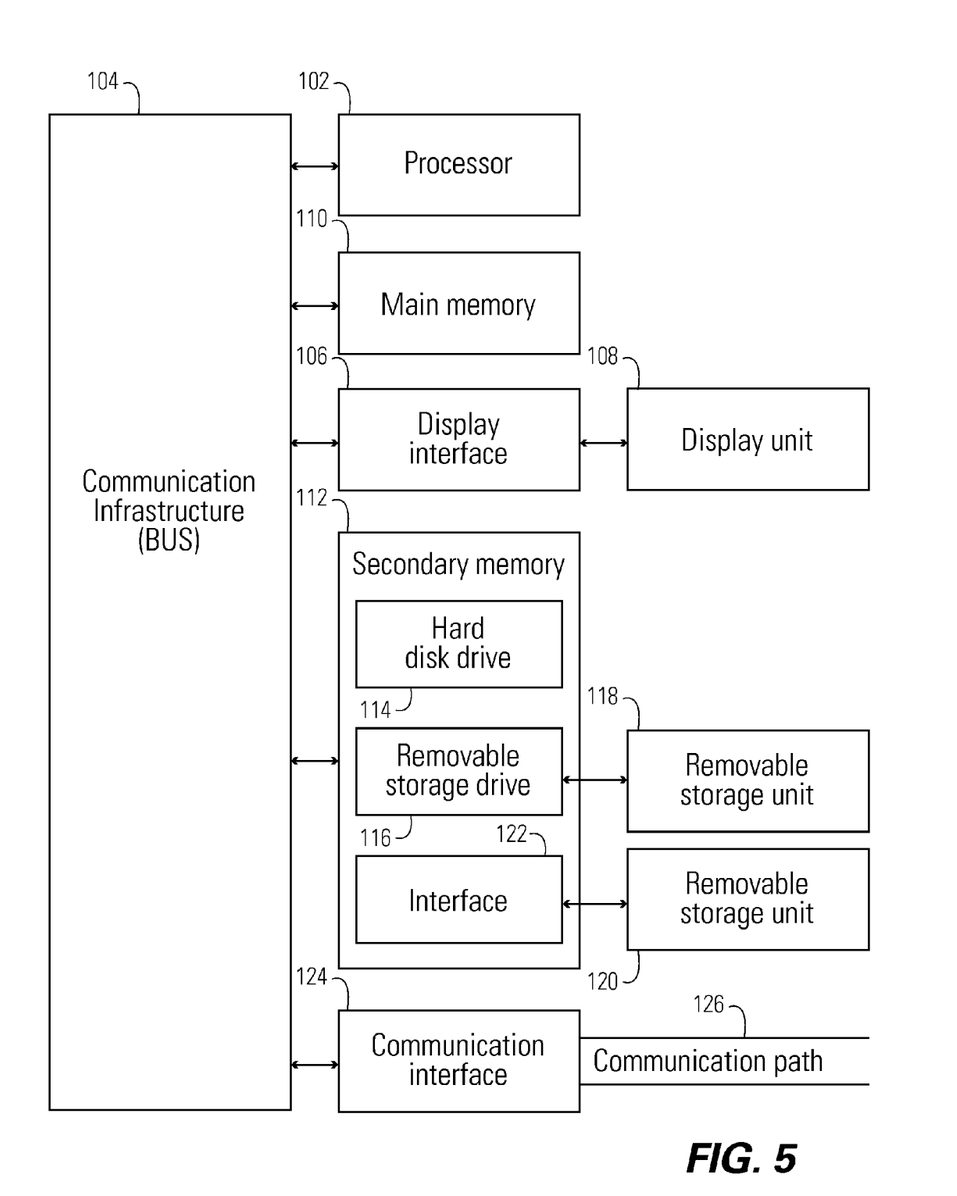
FIG. 5 shows a high level block diagram of an information processing system useful for implementing one embodiment of the present invention.

FIG. 5 is a high level block diagram showing an information processing system useful for implementing one embodiment of the present invention. The computer system includes one or more processors, such as processor 102. The processor 102 is connected to a communication infrastructure 104 (e.g., a communications bus, cross-over bar, or network). Various software embodiments are described in terms of this exemplary computer system. After reading this description, it will become apparent to a person of ordinary skill in the relevant art(s) how to implement the invention using other computer systems and/or computer architectures.

The computer system can include a display interface 106 that forwards graphics, text, and other data from the communication infrastructure 104 (or from a frame buffer not shown) for display on a display unit 108. The computer system also includes a main memory 110, preferably random access memory (RAM), and may also include a secondary memory 112. The secondary memory 112 may include, for example, a hard disk drive 114 and/or a removable storage drive 116, representing, for example, a floppy disk drive, a magnetic tape drive, or an optical disk drive. The removable storage drive 116 reads from and/or writes to a removable storage unit 118 in a manner well known to those having ordinary skill in the art. Removable storage unit 118 represents, for example, a floppy disk, a compact disc, a magnetic tape, or an optical disk, etc. which is read by and written to by removable storage drive 116. As will be appreciated, the removable storage unit 118 includes a computer readable medium having stored therein computer software and/or data.

In alternative embodiments, the secondary memory 112 may include other similar means for allowing computer programs or other instructions to be loaded into the computer system. Such means may include, for example, a removable storage unit 120 and an interface 122. Examples of such means may include a program package and package interface (such as that found in video game devices), a removable memory chip (such as an EPROM, or PROM) and associated socket, and other removable storage units 120 and interfaces 122 which allow software and data to be transferred from the removable storage unit 120 to the computer system.

The computer system may also include a communications interface 124. Communications interface 124 allows software and data to be transferred between the computer system and external devices. Examples of communications interface 124 may include a modem, a network interface (such as an Ethernet card), a communications port, or a PCMCIA slot and card, etc. Software and data transferred via communications interface 124 are in the form of signals which may be, for example, electronic, electromagnetic, optical, or other signals capable of being received by communications interface 124. These signals are provided to communications interface 124 via a communications path (i.e., channel) 126. This communications path 126 carries signals and may be implemented using wire or cable, fiber optics, a phone line, a cellular phone link, an RF link, and/or other communications channels.

In this document, the terms "computer program medium," "computer usable medium," and "computer readable medium" are used to generally refer to media such as main memory 110 and secondary memory 112, removable storage drive 116, and a hard disk installed in hard disk drive 114.

Computer programs (also called computer control logic) are stored in main memory 110 and/or secondary memory 112. Computer programs may also be received via communications interface 124. Such computer programs, when run, enable the computer system to perform the features of the present invention as discussed herein. In particular, the computer programs, when run, enable the processor 102 to perform the features of the computer system. Accordingly, such computer programs represent controllers of the computer system.

From the above description, it can be seen that the present invention provides a system, computer program product, and method for implementing the embodiments of the invention. References in the claims to an element in the singular is not intended to mean "one and only" unless explicitly so stated, but rather "one or more." All structural and functional equivalents to the elements of the above-described exemplary embodiment that are currently known or later come to be known to those of ordinary skill in the art are intended to be encompassed by the present claims. No claim element herein is to be construed under the provisions of 35 U.S.C. section 112, sixth paragraph, unless the element is expressly recited using the phrase "means for" or "step for."

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method comprising:
   creating an aggregated list of items of digital content stored in each media device in an interconnected cluster of media devices, wherein the items of digital content area available for playback by each of the media devices in the interconnected cluster; and
   generating a binary tree by placing a hash representation of the aggregated lists on the leaf nodes of said binary tree and calculating higher nodes on said binary tree as hash values of lower nodes until a root node is calculated, wherein a change in any item of content on any of the media devices results in a change in a plurality of said nodes.

2. A method according to claim 1 further comprising creating an aggregated list and generating said binary tree on each of the media devices in said cluster.

3. A method according to claim 2 further comprising:
   creating in each media device for each item of content in said device, a list of all the known instances of the content in each of said media devices in the interconnected cluster of media devices; and
   periodically synchronizing said lists with the other media devices in said cluster.

4. A method according to claim 3 further comprising periodically updating said binary tree for each media device with changes to said lists resulting from said synchronizing.

5. A method according to claim 4 further comprising:
   periodically updating the binary tree in each media device by exchanging said binary tree for each device with every other media device;
   determine if there are any changes to a binary tree by comparing a root node of a current tree with a root node of a previously stored root node; and
   if the current root node is different, then updating the locally stored binary tree for the media device by replacing only those nodes below the root node that have changed.

6. A method according to claim 1 further comprising:
   determining which media devices in said interconnected cluster of media devices are currently available;
   determining, using said binary tree in said media device which items of content are currently residing in currently available media devices; and
   displaying to a user all said content that is on the currently available media devices.

7. A method according to claim 1 wherein said creating a binary tree further comprises:
   partitioning nodes in said binary tree according to content IDs using a predetermined partitioning criteria; and
   grouping said nodes by content ID based on said partitioning.

8. A method comprising:
   acquiring a list of content items stored in each of a plurality of interconnected media devices, thereby resulting in a plurality of content lists, wherein the content items are digital content available for playback by each of the plurality of interconnected media devices;
   aggregating said content lists into an aggregated list of all of the content items on the interconnected media devices;
   obtaining an update of said content list for a portion of said content list that has changed since the most recent acquiring;

maintaining a copy list of locations of each particular content item for which at least one copy exists among two or more of said plurality of interconnected media devices; and sending to each of said plurality of interconnected media devices the content lists of the other media devices.

9. The method of claim 8 further comprising representing a media device list of the plurality of interconnected media as a binary tree.

10. The method of claim 9 wherein the representing comprises:
grouping content items on said media device into sub-lists;
applying a hash function on each of said sub-lists, thereby generating a fixed sized hash value representation of each of said the sub-lists, wherein said representation comprises hash values;
storing said hash values as the leaf nodes of the binary tree; and
constructing said binary tree so that the higher level nodes of the tree comprise the hash values of lower nodes of said tree.

11. The method of claim 10 wherein obtaining comprises comparing the values of said nodes of the binary tree with previously stored versions of the binary tree.

12. The method of claim 10 wherein maintaining comprises comparing the values of said nodes of the binary tree for each of said media devices with the values of said nodes of the binary tree for each of said other media devices, thereby generating the copy list.

13. The method of claim 12 wherein maintaining further comprises sending said copy list to said media devices.

14. A system comprising:
a plurality of interconnected media players, each having access to items of content stored on one or more of the plurality of interconnected media players, said media players capable of exchanging said digital content with each other, wherein the items of content are digital content available for playback by each of the plurality of interconnected media players; and
a plurality of content lists stored in each media player, each of the plurality of content lists containing a list of each item of content stored in each of said media players and the location of replicas of said item of content in said the plurality of interconnected media players;
wherein each of said plurality of content lists are stored as a binary tree.

15. A system according to claim 14 wherein said binary tree representation is constructed by placing a hash representation of a group of said items of digital content on the leaf nodes of said binary tree and calculating higher nodes on said binary tree as hash values of lower nodes until a root node is calculated, wherein a change in any item of content in any of said media players results in a change in a plurality of said nodes.

16. A system according to claim 14 wherein each media player includes a processor for acquiring the binary tree and updating the binary tree by:
comparing the root nodes of current an previous versions of the binary tree for a media player; and
when the root node has changed, updating only the nodes which are changed.

17. A system according to claim 14 further comprising:
display unit on a plurality of the media players, wherein the processor determines which media players are on-line and uses the binary trees of the on-line media players to determine which content is available and displays the available content on said display unit.

18. A computer program product for synchronizing content directories on cluster media devices, said computer program product comprising:
a non-transitory computer usable medium having computer usable program code embodied therewith, said computer usable program code comprising:
computer usable program code configured to:
generate a binary tree for each media device in a cluster of media devices, the binary trees representing a list of each item of digital content stored in each media device, wherein the items of digital content are available for playback by each of the media devices in the cluster;
store in each media device said binary trees for a plurality of other media devices in said cluster;
use said binary trees for said plurality of other media devices to determine availability of content; and
display said available content.

19. A computer program product according to claim 18 wherein said using binary trees further comprises:
determining which media devices in said cluster are currently available;
determining, using said binary tree in said media device which items of content are currently residing in a currently available media device; and
displaying to a user all said content that is available.

20. A computer program product according to claim 18 further comprising updating stored binary trees by determining which leaves of said stored binary trees must be retrieved to update its local list of content.

* * * * *